United States Patent
Hershman et al.

(10) Patent No.: US 11,601,268 B2
(45) Date of Patent: Mar. 7, 2023

(54) DEVICE ATTESTATION INCLUDING ATTESTATION-KEY MODIFICATION FOLLOWING BOOT EVENT

(71) Applicant: NUVOTON TECHNOLOGY CORPORATION, Hsin-chu (TW)

(72) Inventors: Ziv Hershman, Givat Shmuel (IL); Dan Morav, Herzliya (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 201 days.

(21) Appl. No.: 16/983,360

(22) Filed: Aug. 3, 2020

(65) Prior Publication Data
US 2022/0038272 A1    Feb. 3, 2022

(51) Int. Cl.
*H04L 9/08* (2006.01)
*H04L 9/32* (2006.01)

(52) U.S. Cl.
CPC ............ *H04L 9/0866* (2013.01); *H04L 9/088* (2013.01); *H04L 9/0825* (2013.01); *H04L 9/3265* (2013.01); *H04L 9/3271* (2013.01)

(58) Field of Classification Search
CPC ..... H04L 9/0866; H04L 9/0825; H04L 9/088; H04L 9/3265; H04L 9/3271
See application file for complete search history.

(56) References Cited

U.S. PATENT DOCUMENTS

| | | | |
|---|---|---|---|
| 2016/0099811 A1* | 4/2016 | Hawblitzel | G06F 21/57 713/176 |
| 2017/0103209 A1* | 4/2017 | Wooten | G06F 21/575 |
| 2019/0236281 A1* | 8/2019 | Hershman | G06F 21/85 |
| 2019/0325140 A1* | 10/2019 | Alon | H04L 9/3234 |

OTHER PUBLICATIONS

Spiger et al., "Trusted Computing and Securing Devices", 2017 International Trusted Computing and Security Innovation Summit, Beijing, Session III: Trusted Computing Techniques, pp. 1-19, Apr. 6, 2017.
Mattoon, D., "DICE: Foundational Trust for IoT", Flash Memory Summit 2017, Santa Clara, USA, pp. 1-13, Aug. 9, 2017.

(Continued)

*Primary Examiner* — Phy Anh T Vu
(74) *Attorney, Agent, or Firm* — Kligler & Associates Patent Attorneys Ltd

(57) ABSTRACT

A device including a network interface, a memory and a processor. The network interface is configured to communicate with a verifier over a communication network. The memory is configured to store multiple layers of mutable code, the layers identifiable by respective measurements. The processor is configured to generate, for a given boot cycle, a nonce associated uniquely with the given boot cycle, to receive a challenge from the verifier for attestation of a given layer of the mutable code, to calculate an attestation key based on (i) a Unique Device Secret (UDS) stored securely in the device, (ii) a measurement of the given layer taken by another layer, and (iii) the nonce generated for the given boot cycle, to calculate a response for the challenge, by signing the challenge using the attestation key, and to send the response to the verifier for verification of the given layer.

4 Claims, 5 Drawing Sheets

(56) References Cited

OTHER PUBLICATIONS

Hristozov et al., "Practical Attestation for Tiny IoT Devices", Workshop on Decentralized IoT Security and Standards (DISS) 2018, San Diego, Ca, USA, pp. 1-6, Feb. 18, 2018.
TCG., "Symmetric Identity Based Device Attestation," Version 1.0, Revision 0.95, pp. 1-15, Jan. 7, 2020.
TCG., "TCG Trusted Attestation Protocol (TAP) Use Cases", Version 1.0, Revision 0.33, pp. 1-16, Aug. 13, 2019.
TCG., "DICE Certificate Profiles", Version 1.0, Revision 0.01, pp. 1-14, Mar. 10, 2020.
TCG., "DICE Layering Architecture", Version 1.0, Revision 0.19, pp. 1-31, Mar. 9, 2020.
Brostroem et al., "IoT boot integrity measuring and reporting", SIGBED Review, vol. 15, issue 5, pp. 14-21, Oct. 2018.
TCG Published, "Hardware Requirements for a Device Identifier Composition Engine", Family "2.0", Level 00, Revision 78, pp. 1-12, Mar. 22, 2018.
TCG Published, "Implicit Identity Based Device Attestation", Version 1.0, Revision 0.93, pp. 1-18, Mar. 5, 2018.
Krawczyk et al., "HMAC: Keyed-Hashing for Message Authentication," Request for Comments (RFC) 2104, Network Working Group, pp. 1-11, Feb. 1997.
Chen, L., "Recommendation for Key Derivation Using Pseudorandom Functions (Revised)", pp. 1-21, Oct. 2009.
FIPS Pub 186-4, "Digital Signature Standard (DSS)," pp. 1-130, Jul. 2013.

\* cited by examiner

*FIG. 3A*  *FIG. 3B*
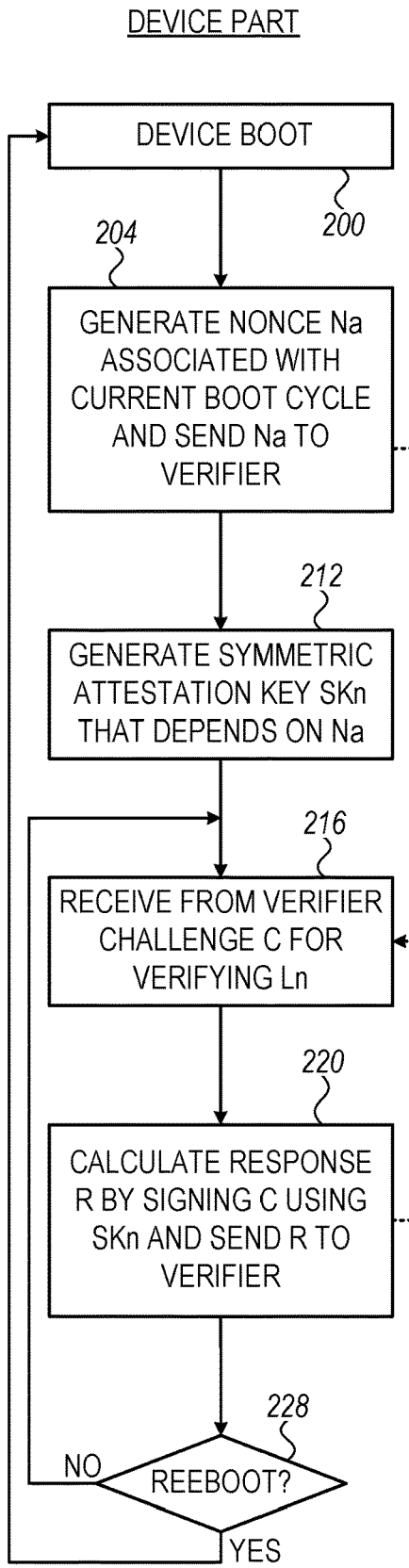
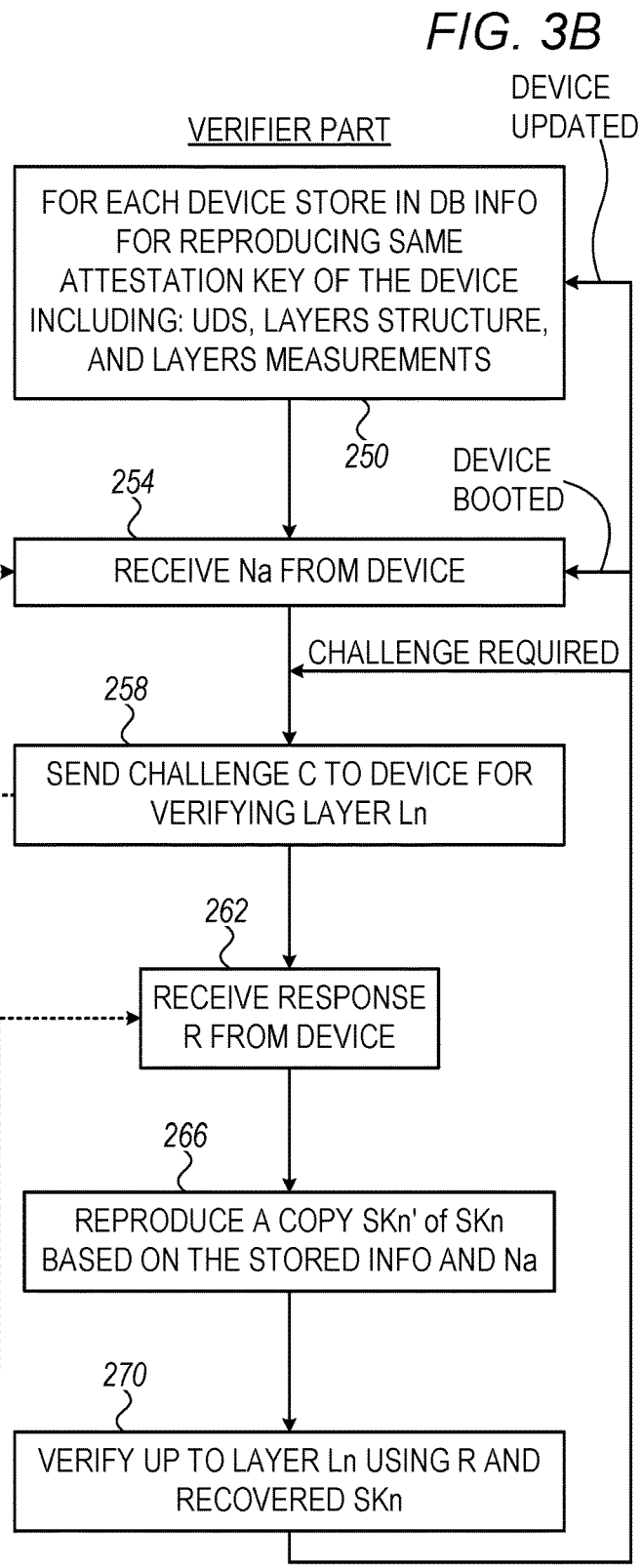

DEVICE ATTESTATION INCLUDING ATTESTATION-KEY MODIFICATION FOLLOWING BOOT EVENT

TECHNICAL FIELD

Embodiments described herein relate generally to secure computing, and particularly to methods and systems for attestation of a device running layered software.

BACKGROUND

In various secure computing environments, a computing device is required to prove or attest its state and identity to an entity known as a verifier. Methods for device attestation are known in the art. For example, the Trusted Computing Group (TCG) has defined a Device Identifier Composition Engine (DICE), and developed device attestation architectures that are based on the DICE. The DICE-based attestation schemes may employ symmetric key or asymmetric key cryptography. DICE-based specifications are described for example, in some references cited herein.

Hardware requirements for the DICE are described, for example, in "Hardware Requirements for a Device Identifier Composition Engine," Family "2.0" Level 00, Revision 78, Mar. 22, 2018.

DICE-based attestation schemes using asymmetric key cryptography are described, for example, in "Implicit Identity Based Device Attestation," Version 1.0, Revision 0.93, Mar. 5, 2018.

DICE-based attestation schemes using symmetric key cryptography are described, for example, in "Symmetric Identity Based Device Attestation," Version 1.0, Revision 0.95, Jan. 7, 2020.

DICE layering architectures are described, for example, in "DICE Layering Architecture," Version 1.0, Revision 0.19, Mar. 19, 2020.

DICE certificate profiles are described, for example, in "DICE Certificate Profiles," Version 1.0, Revision 0.01, Mar. 10, 2020.

SUMMARY

A device including a network interface, a memory and a processor. The network interface is configured to communicate with a verifier over a communication network. The memory is configured to store multiple layers of mutable code, the layers identifiable by respective measurements. The processor is configured to generate, for a given boot cycle, a nonce associated uniquely with the given boot cycle, to receive a challenge from the verifier for attestation of a given layer of the mutable code, to calculate an attestation by deriving the attestation key from (i) a Unique Device Secret (UDS) stored securely in the device, (ii) a measurement of the given layer taken by another layer, and (iii) the nonce generated for the given boot cycle, to calculate a response for the challenge, by signing the challenge using the attestation key, and to send the response to the verifier for verification of the given layer.

In some embodiments, the processor is configured to calculate the attestation key depending on the nonce, so that an attestation key that was used by the processor for attestation before the given boot cycle becomes invalid for attestation within the given boot cycle. In other embodiments, the processor is configured to set the attestation key to differ from the attestation key that was used by the processor for attestation before the given boot cycle, even when the mutable code of the given layer and of layers executed before the given layer remain intact for the given boot cycle. In yet other embodiments, the attestation key includes a symmetric key that depends on the nonce, and the processor is configured to calculate the response by signing at least the challenge using the symmetric key, and to send both the response and the nonce to the verifier.

In an embodiment, the attestation key includes an asymmetric key that depends on the nonce, and the processor is configured to calculate the response by signing the challenge using a private key of the asymmetric key, and to send the response but not the nonce to the verifier. In another embodiment, the processor is configured to produce asymmetric keys for the respective layers, including the attestation key, each asymmetric key including respective private key and public key, to produce a chain of certificates, a certificate in a given layer certifies a public key produced in a subsequent layer and is signed using a private key produced in the given layer, and to send the chain of certificates to the verifier to perform verification using a certified public key of the attestation key. In yet another embodiment, the chain of certificates includes a certificate that was produced independently from the nonce and that proves that the device has been produced by a specific manufacturer.

In some embodiments, the processor is configured to generate the nonce in a trusted layer that is executed before the given layer, to calculate a secret in the trusted layer based on the nonce, and to calculate the attestation key depending on the secret. In other embodiments, the processor is configured to execute the code of the multiple layers in a predefined order, and to proceed, according to the predefined order, from a selected layer to a subsequent layer only when the selected layer has been successfully verified by the verifier. In yet other embodiments, the processor is configured to calculate the attestation key depending on the nonce for mitigating a zero-day attack.

There is additionally provided, in accordance with an embodiment that is described herein, a method, including, in a device that communicates with a verifier over a communication network, storing in a memory of the device multiple layers of mutable code, the layers identifiable by respective measurements. For a given boot cycle, a nonce associated uniquely with the given boot cycle is generated. A challenge is received from the verifier for attestation of a given layer of the mutable code. An attestation key is calculated by deriving the attestation key from (i) a Unique Device Secret (UDS) stored securely in the device, (ii) a measurement of the given layer taken by another layer, and (iii) the nonce generated for the given boot cycle. A response for the challenge is calculated by signing the challenge using the attestation key. The response is sent to the verifier for verification of the given layer.

There is additionally provided, in accordance with an embodiment that is described herein, a verifier, including a network interface and a processor. The network interface is configured to communicate with a device over a communication network, the device including multiple layers of mutable code, and generates a nonce associated uniquely with a given boot cycle. The processor is configured to send a challenge to the device for verification of a given layer of the mutable code, to receive from the device response information generated by the device in response to the challenge, the response information depends on the nonce associated with the given boot cycle, and to verify the given layer of the mutable code using the response information.

In some embodiments, the response information includes at least the challenge signed by an attestation key that depends on the nonce, and the processor is configured to store securely in a memory of the verifier, before sending the challenge, device information that together with the nonce is sufficient for recovering the attestation key, to receive the nonce from the device, to recover the attestation key using the device information and the received nonce, and to verify the given layer of the mutable code using the recovered attestation key. In other embodiments, the response information includes (i) a digital signature of the challenge signed using a private key of an asymmetric attestation key and (ii) a certificate of a public key associated with the given layer, and the processor is configured to verify a public key certified in a certificate that was signed using a private key matching the public key, and then verifying the digital signature using the verified public key.

There is additionally provided, in accordance with an embodiment that is described herein, a method for device verification, including, in a server that communicates with a device over a communication network, the device including multiple layers of mutable code and generates a nonce associated uniquely with a given boot cycle, sending a challenge to the device for verification of a given layer of the mutable code. Response information generated by the device in response to the challenge is received from the device, the response information depends on the nonce associated with the given boot cycle. The given layer of the mutable code is verified using the response information.

These and other embodiments will be more fully understood from the following detailed description of the embodiments thereof, taken together with the drawings in which:

BRIEF DESCRIPTION OF THE DRAWINGS

FIGS. 3A and 3B are flow charts that schematically illustrate methods for device attestation and verification using symmetric key cryptography, in accordance with embodiments that are described herein;

DETAILED DESCRIPTION OF EMBODIMENTS

Overview

Figure 1:
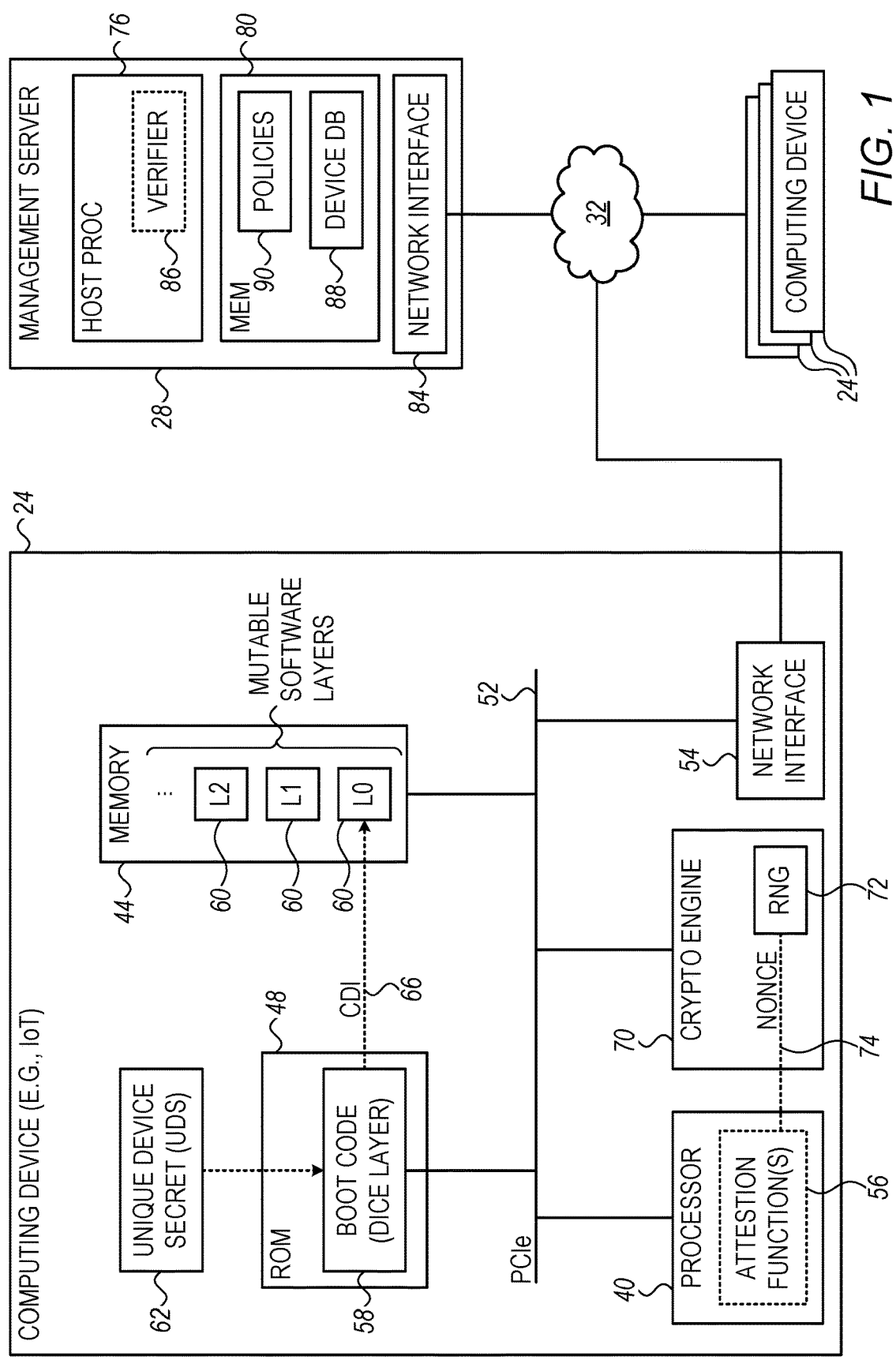
FIG. 1 is a block diagram that schematically illustrates a computing system supporting secure device attestation, in accordance with an embodiment that is described herein.

Embodiments that are described herein provide improved methods and systems for device attestation, including attestation-key modification following boot event.

In cloud and other computing environments such as Internet of Things (IoT) networking, computing devices run software comprising layers of code. The code of each layer may be occasionally modified, e.g., for bug fix, or downloading an upgraded version. Since mutable code may be vulnerable to hacking, security demands may require verifying the identity and software state of the computing device.

In some embodiments, an external verifier verifies the computing device (e.g., a given code layer) using a challenge-response protocol. The verifier sends a challenge to the device, which sends an attestation response back to the verifier, for verification of the identity and integrity of the computing device. The device typically calculates the response by applying to the challenge a suitable cryptographic operation such as producing a digital signature, using a secret attestation key.

In the description that follows and in the claims, the term "attestation" refers to the operations carried out by a device requested to attest its state, and the term "verification" refers to the operations carried out by an external verifier to trigger the device to perform attestation and verifying the device state. A scheme that involves both the verifier and the device that responses to an attestation request from the verifier is referred to herein as an "attestation scheme."

In some embodiments, the attestation key is derived from secrets that are produced by the code layers, depending on the device's identity and on measurements of the code layers. A measurement of a given code layer may comprise a result of applying a secure hash function to the underlying code or firmware. When an unauthorized party modifies one or more code layers but has no access to a matching attestation key, the verification fails.

In certain types of attacks, a device secret key may leak, and used by an unauthorized attacker to perform attestation, impersonating to the device. Upon detecting a secret leakage, the device owner may download to the device an updated software or firmware version that overcomes the source of the leak. Fixing the leak and updating a large number of devices in the field, however, may take a relatively long time, during which the attacker may cause significant damage.

Note that the attack may be carried out successfully, because after reboot and before the device is updated, the device generates the same attestation key, which is already known to the attacker. An example attack of this sort is sometimes referred to as a "zero-day attack."

In the disclosed embodiments, the device generates a different attestation key after each boot event. As a result, the value of the attestation key before reboot becomes invalid for attestation after the reboot. This mechanism increases the security of the attestation-verification scheme against various attacks including the zero-day attack.

Consider a device, comprising a network interface, a memory and a processor. The network interface serves for communicating with a verifier over a communication network. The memory stores multiple layers of mutable code, the layers are identifiable by respective measurements. The processor generates for a given boot cycle, a nonce associated uniquely with the given boot cycle. The processor receives a challenge from the verifier for attestation of a given layer of the mutable code, and calculates an attestation key by deriving the attestation key from (i) a Unique Device Secret (UDS) stored securely in the device, (ii) a measurement of the given layer taken by another layer, and (iii) the nonce generated for the given boot cycle. The processor calculates a response for the challenge, by signing the challenge using the attestation key, and sends the response to the verifier for verification of the identity and integrity of the given layer. In the description that follows and in the claims the phrase "deriving the attestation key from a given factor" means that modifying this factor causes modifying the attestation key. The attestation key, however, may be derived directly or indirectly from that factor.

In the disclosed embodiments, the processor generates a chain of secrets along the layers, starting in a trusted hardware layer, referred to as a Device Identifier Composition Engine (DICE) layer. In accordance with the DICE standards cited above, the DICE layer securely stores a Unique Device Secret (UDS). The UDS serves as a Root of Trust (RoT) for a chain of trust comprising the DICE layer and other layers.

At boot, the processor unconditionally executes the DICE layer, which performs a measurement of the first mutable layer. Based on the UDS and the measurement, the DICE layer generates a secret denoted Compound Device Identification (CDI) for the first mutable layer. In a similar manner, each mutable layer produces a secret for the next layer from a secret generated in a previous layer and from a measurement of the next layer. The processor derives an attestation key for a given layer from the secret of that layer generated by the previous layer.

In some embodiments, the processor calculates the attestation key depending on the nonce, so that an attestation key that was used by the processor for attestation before the given boot cycle, becomes invalid for attestation within the given boot cycle. The processor sets the attestation key to differ from the attestation key used for attestation before the given boot cycle, even when the mutable code of the given layer and of layers executed before the given layer remain intact for the given boot cycle.

In one embodiment, the attestation key comprises a symmetric key that depends on the nonce, and the processor calculates the response by signing at least the challenge using the symmetric key, and sends both the response and the nonce to the verifier.

In another embodiment, the attestation key comprises an asymmetric key pair that depends on the nonce, and the processor calculates the response by signing the challenge using a private key of the asymmetric key pair and sends the response, but not the nonce, to the verifier. In this case, the processor produces asymmetric keys for the respective layers, including the attestation key, each asymmetric key pair comprising respective private key and public key. The processor produces a chain of certificates, wherein a certificate in a given layer certifies a public key produced in a subsequent layer and is signed using a private key produced in the given layer. The processor sends the chain of certificates to the verifier to perform verification using a certified public key of the attestation key.

In an embodiment, the chain of certificates comprises a certificate that was produced independently from the nonce and that proves that the device has been produced by a specific manufacturer. This certificate may start the chain of certificates and be produced by an external certification authority.

In some embodiments, the processor generates the nonce in a trusted layer that is executed before the given layer (the layer being verified), calculates a secret in the trusted layer based on the nonce, and calculates the attestation key depending on the secret.

The processor typically executes the code of the multiple layers in a predefined order. In one embodiment, the processor executes all the layers, according to the order, and attests the last layer. In another embodiment, the processor proceeds, according to the predefined order, from a selected layer to a subsequent layer only when the selected layer has been successfully verified by the verifier.

In the disclosed techniques, an attestation scheme is described, in which the device produces a random nonce that is associated with a boot cycle and calculates an attestation key depending indirectly on that nonce. In this scheme, an attestation key that was used in the previous boot cycle becomes invalid for attestation after a reboot. The disclosed attestation schemes enable the device to mitigate attacks such as, for example, the zero-day attack. The disclosed attestation scheme is applicable for both symmetric attestation keys and asymmetric attestation keys.

System Description

FIG. 1 is a block diagram that schematically illustrates a computing system 20 supporting secure device attestation, in accordance with an embodiment that is described herein.

Computing system 20 comprises multiple computing devices 24, controlled by a management server 28 over a communication network 32. Communication network 32 may comprise any suitable packet network operating using any suitable communication protocols such an Ethernet network or an IP network such as the Internet. Communication network 32 may comprise a Local Area Network (LAN), a Wide Area Network (WAN), a wireless network, or a combination of packet networks of several types.

Computing system 20 can be used, for example, in verifying low-cost devices such as Internet of Things (IoT) devices (24). Alternatively or additionally, other types of computing devices such as servers can also use the disclosed attestation and verification techniques.

Computing device 24 (also referred to simply as "device" for brevity) comprises a processor 40, coupled to a re-writable memory 44 and to a Read Only Memory (ROM) 48 via a bus 52 such as, for example, a Peripheral Component Interconnect Express (PCIe) bus, or any other suitable bus. Computing device 24 accesses communication network 32 using a network interface 54, e.g., a Network Interface Controller (NIC).

Processor 40 typically runs one or more application programs. Such an application program may interact with other devices or servers over communication network 32, which may make the device vulnerable to security attacks. Among other tasks, processor 40 performs attestation function(s) 56 for proving its state and identity, as will be described in detail below. Note that attestation function(s) 56 are depicted as executed by the processor, for clarity. The code of the attestation functions, however, is typically stored in memory 44 (or in any other suitable memory accessible by the processor—not shown).

ROM 48 stores a boot code 58, which processor 40 executes unconditionally upon reset or power on. Memory 44 stores multiple software layers 60, which may be modified as necessary, e.g., for fixing a functional bug or resolving a security vulnerability. In the example of FIG. 1, first three layers 60 are denoted L0, L1 and L2. Boot code 58 is also referred to as a "DICE layer." The DICE layer is immutable and highly secured, and therefore is considered a trusted layer.

Each layer may securely exchange secret information with a subsequent or previous layer, thus building a chain of trust that starts with the DICE layer. For example, in some embodiments, access to the UDS (e.g., from layers L0 ... Ln) is blocked before the DICE layer passes control to layer 0. In the general case, each layer Li prevents access to its secret Si and other secret information before passing control to the next layer Li+1. Preventing access may be implemented, for example, by blocking the access, or by erasing secret information in layer Li from memory.

In the description that follows, referring to a layer performing some operation means that processor 40 performs that task by executing the code of the layer.

A boot sequence begins with processor 40 executing boot code 58, followed by executing software layers 60 sequentially, until the underlying operating system and applications are up and running. The sequential execution of the layers forms a chain of trust, wherein each trusted layer provides secrets to the subsequent layer. A trusted software layer can be trusted to have certain properties. For example, a trusted layer may be trusted to possess secrets produced by the previous trusted layer.

Computing device 24 comprises a Unique Device Secret (UDS) 62 serving as a root of trust for attestation. In some embodiments, UDS 62 is immutable and may be embedded securely in hardware. For example, the UDS may be implemented in a One Time Programmable (OTP) memory, or as a Physical Unclonable Function (PUF). Alternatively, the UDS may be burned in ROM 48. Further alternatively, any other suitable method for securely embedding UDS 62 in hardware can also be used, e.g., using a combination of some or all of OTP, PUF and ROM.

The UDS is assumed to be accessible only by the DICE layer. Upon device boot, the DICE layer generates from UDS 62 a secret known in the TCG specifications as a Compound Device Identifier (CDI) 66. The DICE layer provides the CDI to layer L0 in a secured manner.

Computing device 24 comprises a cryptographic engine 70 supporting various cryptographic operations such as encryption, decryption, hashing, generation and verification of digital signatures, generation of random numbers, and the like. In some embodiments, cryptographic engine 70 performs cryptographic calculations required for device attestation, on behalf of processor 40.

Cryptographic engine 70 comprises a Random Number Generator (RNG) 72 that generates a random or pseudo-random cryptographic nonce 74 to be used by processor 40 for attestation. As will be described below, cryptographic nonce 74 implicitly modifies an attestation key, so that the value of the attestation key before a boot event becomes invalid for attestation after the boot event.

Cryptographic nonce 74 comprises a random or pseudo-random number, having a sufficiently number of bits to ensure that practically no repeated nonce values will be generated. In the disclosed attestation schemes, cryptographic nonce 74 is generated in association with a boot cycle, (e.g., once per a boot cycle) as will be described in detail below.

Management server 28 comprises a host processor 76 and a memory 80. Management server 28 communicates with computing devices 24 over communication network 32 using a network interface 84. In some embodiments, memory 80 stores a database (DB) 88 of computing devices 24 that are under its control, and policies 90. Memory 80 may comprise, for example, a Random-Access Memory, a nonvolatile memory or any other suitable type of storage. Management server 28 may communicate with computing devices 24 for various purposes such as software provisioning, sending to a device 24 commands to perform relevant tasks and receiving reports from the devices. Management server 28 verifies the identity and state of a device 24, using a verifier program 86, which is also referred to herein simply as "verifier" for brevity. The verifier (and device 24) may implement a suitable challenge-response method, as will be described in detail below.

Policies 90 specify to host processor 76 security polices to be applied to devices 24. A given policy may specify a schedule for performing device verification, which of the layers in each device require verification, what action to take when the device fails verification, authorized firmware versions and the like.

The configurations of computing system 20, computing device 24 and management server 28 shown in FIG. 1 are example configurations that are depicted purely for the sake of conceptual clarity. In alternative embodiments, any other suitable computing system, computing device and management server configurations can be used. Elements that are not mandatory for understanding of the disclosed techniques have been omitted from the figure for the sake of clarity.

In various embodiments, the different elements of computing system 20 (e.g., computing device 24) may be implemented using any suitable hardware, such as using one or more discrete components, one or more Application-Specific Integrated Circuits (ASICs) and/or one or more Field-Programmable Gate Arrays (FPGAs). Some computer system elements may be implemented in software, or using a combination of software and hardware elements.

In some embodiments, each of processor 40 and host processor 76 comprises a general-purpose programmable processor, which is programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

Attestation Schemes Using Symmetric Key Cryptography

Figure 2:
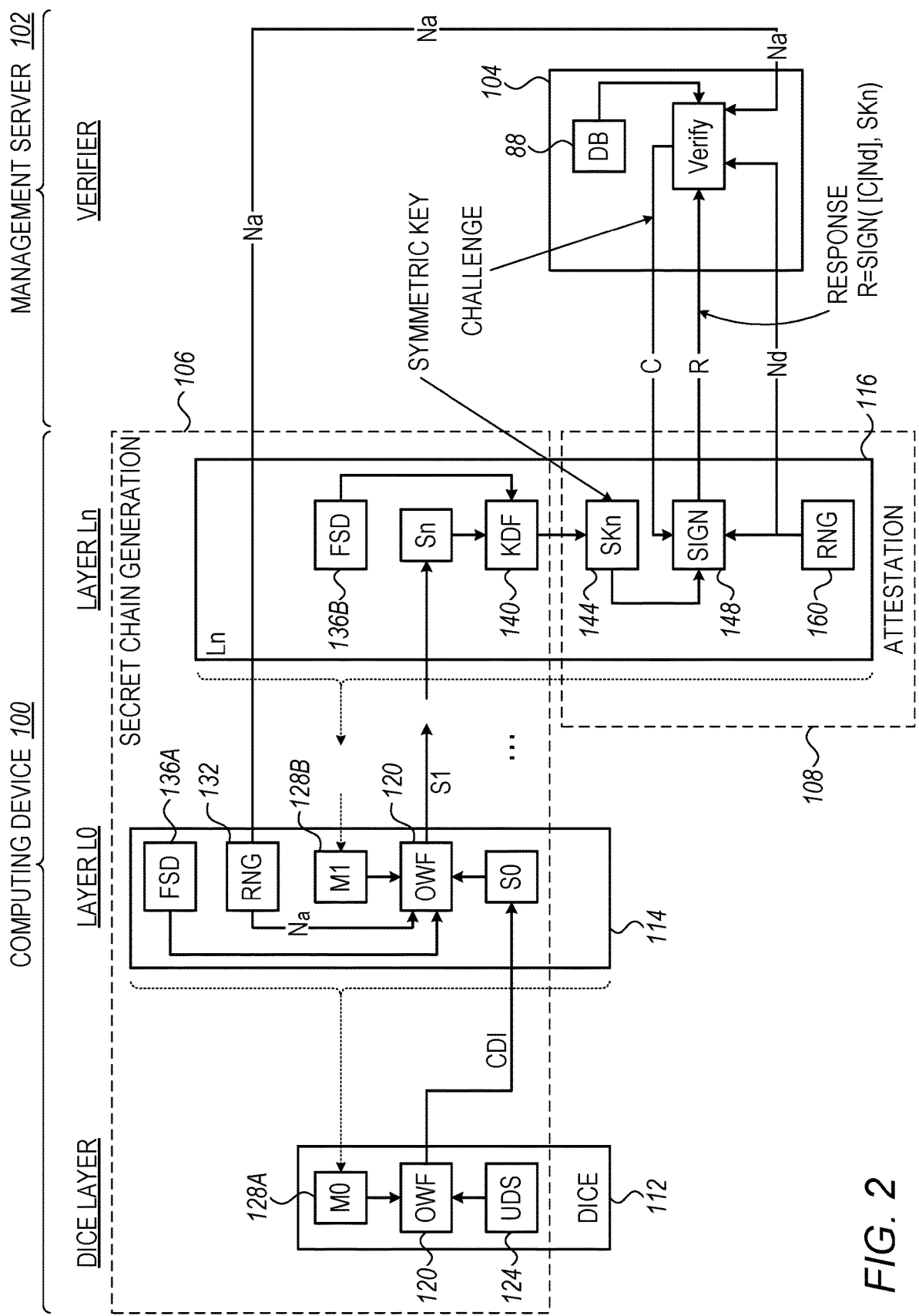
FIG. 2 is a diagram that schematically illustrates a device layering scheme used in symmetric key attestation, in accordance with an embodiment that is described herein.

FIG. 2 is a diagram that schematically illustrates a device layering scheme used in symmetric key attestation, in accordance with an embodiment that is described herein.

In FIG. 2, a computing device 100 is verified using a management server 102 running a verifier 104. Computing device 100, management server 102 and verifier 104 may be used in implementing computing device 24, management server 28 and verifier program 86 of FIG. 1.

Device 100 runs multiple layers of code, also referred to simply as "layers" for brevity. The first layer is denoted a "DICE layer" 112, which typically comprises immutable code. Additional layers running mutable code are denoted L0 . . . Ln. In FIG. 2, only layers L0 114 and Ln 116 are shown, for clarity. The DICE layer serves as a root of trust layer and is typically executed unconditionally at device boot. The layers L0 . . . Ln are typically executed in a predefined order (e.g., sequentially) after the DICE layer. Various tasks implemented by computing device 100, including layers L0 . . . Ln and attestation tasks are executed by processor 40.

Device 100 comprises a Secret Chain Generation (SCG) 106 module, and an attestation module 108. The layers in SCG 106 generate a sequence of secrets denoted S0 . . . Sn. The DICE layer produces the first secret S0 that is used in layer L0, layer L0 produces secret S1 that is used in layer L1, and so on. In the present example, attestation module 108 is coupled to the last layer Ln. Based on the chain of trust, the attestation in this case covers the DICE layer and the mutable layers L0 . . . Ln. Alternatively, attestation module 108 may be coupled to a mid-layer Li selected from among the layers L0 . . . Ln−1, in which case the attestation would cover the DICE layer and the layers L0 . . . Li.

In FIG. 2, the DICE layer and each of layers L0 . . . Ln−1 comprises a One-Way Function (OWF) 120 that generates a secret for a corresponding next layer among L1 . . . Ln.

Specifically, the OWF of DICE layer 112 generates secret S0 for L0, the OWF of layer L0 generates secret S1 for L1, and so on.

Each of layers L0 . . . Ln is identifiable by a corresponding measurement (128) M0 . . . Mn. A measurement of a layer may comprise, for example, a cryptographic hash function calculated over the layer's code, software image, data and/or firmware, or over a combination of two or more of the above. In some embodiments, generating a secret $S_{i+1}$ by a given layer Li is based on a measurement $M_{i+1}$ that the given layer performs on the next layer (according to the layers order), and on the secret Si produced by the previous layer Li−1. In some embodiments, by using the above scheme, each layer is measured by a layer that is assumed to be trusted or previously verified as trusted.

OWF 120 should be computationally hard to invert so that it would be impractical to deduce the secret input to the OWF (e.g., secret Si) given the secret output by the OWF (Si+1) and the input measurement Mi. In an example embodiment, OWF 120 comprises a cryptographically secure hash function. Example OWF 120 functions include, but are not limited to, the Message Authentication Code (MAC), Hashed-based MAC (HMAC), Cipher-based MAC (CMAC) and the SHA-3 based function Keccak MAC (KMAC).

The HMAC function used as an example OWF 120 in some of the disclose embodiments, is specified, for example, in a Request for Comments (RFC) 2104, titled "HMAC: Keyed-Hashing for Message Authentication," February, 1997.

To generate secret S0, the DICE layer produces a measurement 128A of layer L0. Having no previous layer, the DICE layer comprises a securely embedded Unique Device Secret (UDS) 124. The UDS is known only to the DICE layer and the verifier. Depending on implementation, the UDS may be known also to the device manufacturer. In an embodiment, the DICE layer produces secret S0 using a HMAC function by calculating S0=HMAC(M0,UDS), wherein the UDS serves as the HMAC key. In the TPG terminology, the secret S0 produces by the DICE layer is also referred to as a Compound Device Identifier (CDI).

For producing secret Si, layer L0 takes a measurement 128B (denoted M1) of layer L1 and receives secret S0 from the DICE layer. In the present example, layer L0 comprises a Random Number Generator (RNG) 132 that generates a nonce denoted "Na" after device boot. In some embodiments, the OWF of layer L0 receives as inputs (i) measurement M1 of layer L1, (ii) secret S0 from the DICE layer, and (iii) nonce Na generated using RNG 132. The OWF of layer L0 generates secret Si by calculating S1=HMAC([M1|Na], S0), wherein S0 comprises the HMAC key and the concatenated data [M1|Na] is the data input to the HMAC function. In other layers a secret Si+1 is calculated as Si+1=HMAC ([Mi+1], Si).

In the example of FIG. 2, the nonce Na is input to the OWF of layer L0, which is typically implemented as a minimal code that is expected to be bug-free that requires no (or only once in a long while) updating and therefore L0 is considered a trusted layer. In general, however, nonce Na may be input to the OWF of any other layer among L1 . . . Ln that is considered trusted.

In some embodiments, one or more layers among L0 . . . Ln comprises a respective Firmware Security Descriptor (FSD) 136. The FSD comprises a self-measurement that a layer has or calculates on itself. In FIG. 2, for example, layer L0 comprises FSD 136A, and layer Ln comprises FSD 136B. In each of layers L0 . . . Ln−1, the FSD may be incorporated to the secret calculation by the OWF. For example, in layer L0 of FIG. 2, FSD 136A is provided to the OWF of layer L0. In this case, the OWF calculates S1 as S1=HMAC([M1|FSD|Na],S0). In this case the secret S1 depends on the measurement M1 taken by both L0 and L1.

In the example of FIG. 2, the last layer (Ln 116) performs a device attestation protocol using attestation module 108. The attestation protocol is generally carried out at the device side by (i) receiving a challenge from verifier 104, (ii) signing the challenge using an attestation key to produce a response, and (iii) sending the response to the verifier for verification, as described herein.

Layer Ln produces from secret Sn, using a Key Derivation Function (KDF) 140, a symmetric key 144 denoted SKn that is used for attestation. Several families of key derivation functions that use pseudorandom functions are described, for example, by the author Lily Chen, in the NIST special publication 800-108, titled "Recommendation for Key Derivation Using Pseudorandom Functions (Revised)," October 2009. Attestation module 108 receives a challenge denoted "C" generated by the verifier (typically C comprises a random or pseudo-random number), and a device nonce denoted "Nd" generated by a RNG 160 in response to the challenge. Attestation module 108 produces a response denoted "R" by signing [C|Nd] using SKn 144.

The verifier receives the response R from the device, and also receives Na and Nd, and calculates R' locally by signing [C|Nd] using the same key value as SKn. In some embodiments, the verifier calculates SKn based on the UDS and measurements Mi, using the same architecture, OWF and KDF functions, which the device uses in locally calculating its own SKn. The device is verified successfully when R equals R'. After device boot, the nonce Na is regenerated, which indirectly causes a modification to the value of attestation key SKn compared to its value before the boot. As a result, an attacker that managed to extract the value of SKn before a boot, cannot use it for attestation after the boot.

FIGS. 3A and 3B are flow charts that schematically illustrate methods for device attestation and verification using symmetric key cryptography, in accordance with embodiments that are described herein.

The attestation scheme may be executed by device 24 and verifier 86 of FIG. 1. Device 24 is assumed to implement the layering scheme depicted in FIG. 2. In performing the attestation protocol, the device and verifier may communicate with one another, e.g., over communication network 32.

The method of FIG. 3A (device part) begins with processor 40 of device 24 starting a boot cycle, at a booting step 200. In performing the boot, processor 40 starts executing DICE layer 112. At a nonce generation step 204, the processor generates (e.g., using RNG 132) the nonce "Na" that is uniquely associated with the present boot cycle, and sends Na to the verifier. Alternatively, the processor may securely send the nonce Na across at least some of layers L1 . . . Ln, and send the Na to the verifier by a layer other than L0, e.g., Ln. In an embodiment, the processor sends the nonce Na together with the response at step 220 below.

At a key generation step 212, the processor generates in layer Ln a symmetric attestation key denoted "SKn." For example, the processor generates SKn by applying function OWF 120 to secret Sn of layer Ln. The attestation key SKn depends on the nonce Na via the chain of secrets starting at the layer in which Na was input to the layer's OWF.

At a challenge reception step 216, the processor receives from the verifier a challenge "C" for verifying the last layer Ln. Alternatively, the processor could receive a challenge for verifying another layer among L0 . . . Ln−1.

At a response calculation step 220, the processor generates, in response to the challenge, a response denoted R by signing the challenge C, using the attestation key SKn (e.g., using signing function 148). For example, the processor calculates the response as R=MAC(C,SKn). In some embodiments, the processor generates for C a device nonce denoted Nd (e.g., using RNG 160, and calculates the response as R=MAC([C|Nd],SKn). Incorporating the Nd nonce into the response R, may assist in overcoming an attack that attempts to guess SKn by sending multiple selected challenge values to the device. Further at step 220, processor 40 sends the response R to the verifier. As noted above, in some embodiments, the processor sends, at step 220, both the response R and the nonce Na to the verifier.

At a boot query step 228, the processor checks whether a reboot is required or occurring, and if not, loops back to step 216 to receive a subsequent challenge for the same or another layer within the same boot cycle. Otherwise, the processor loops back to step 200 to start a subsequent boot cycle, and regenerate nonce Na having a different value compared to the Na value prior used in the previous boot cycle.

In the embodiment of FIG. 3A, the processor generates SKn once per a boot cycle. In other embodiments, the processor may generate SKn in response to receiving a challenge C. In this embodiment, step 212 of FIG. 3A may be executed after step 216 and before step 220.

The method of FIG. 3B (verifier part) is typically performed in parallel to the method of FIG. 3A. The method of FIG. 3B begins with host processor 76 storing device information in a database of the verifier (e.g., DB 88), at a storage step 250. The device information may be used for recovering the symmetric attestation key SKn used by the device in generating the response to a given challenge. To this end, the host processor stores device information for each device that contains at least the UDS (62) of the DICE layer of the device, the layers configuration used by the device, and the measurements associated with the respective layers. The verifier uses the device information (and a nonce Na), to locally calculate the same SKn value as calculated by the authorized device, as will be described below.

At a nonce reception step 254, the verifier receives a nonce Na, generated by the device in association the current boot cycle. Typically, the device provides Na to the verifier once per a boot cycle. Alternatively, the device may generate Na multiple times within the same boot cycle, and report each updated Na to the verifier. In some embodiments, instead of receiving the nonce Na at step 254, the verifier receives Na together with the response as will be described at step 262 below.

At a challenge sending step 258, the verifier generates a challenge "C" for verifying layer Ln of the device, and sends the challenge to the device. The verifier typically generates the challenge as a random or pseudo-random number. The verifier issues a different challenge each time, so that knowledge of a previous response is of no use. Using different challenges is useful, for example, in mitigating replay attacks. The verifier may generate and send the challenge at any suitable time, such as, for example, in response to a request from the device, controlled by an administrator request, or periodically.

At a response reception step 262, the verifier receives from the device a response "R" corresponding to the previously sent challenge "C" at step 258. At a key recovery step 266, the verifier locally reproduces a copy SKn' of the symmetric attestation key SKn, using the device information stored at step 250, and the nonce Na received at step 254.

At a verification step 270, the verifier uses the response R and the recovered attestation key SKn' to verify layer Ln of the device. Due to the chain of trust in the device, by verifying layer Ln, the DICE layer and layers L0 . . . Ln-1 are verified as well. As noted above, since the attestation key SKn depends on the nonce Na, an attacker that somehow got hold of the attestation key SKn would fail attestation after reboot because the value of Na has changed.

Following step 270, the verifier loops back to one of steps 250, 254 and 258. Specifically, the verifier loops back to step 250 when the device has been updated, e.g., with an updated software or firmware version. Alternatively, the verifier loops back to step 254 after the device has been booted, for receiving an Na associated with the current boot cycle. Further alternatively, the verifier loops back to step 258 to send a subsequent different challenge to the device.

Attestation Schemes Using Asymmetric Key Cryptography

Figure 4:
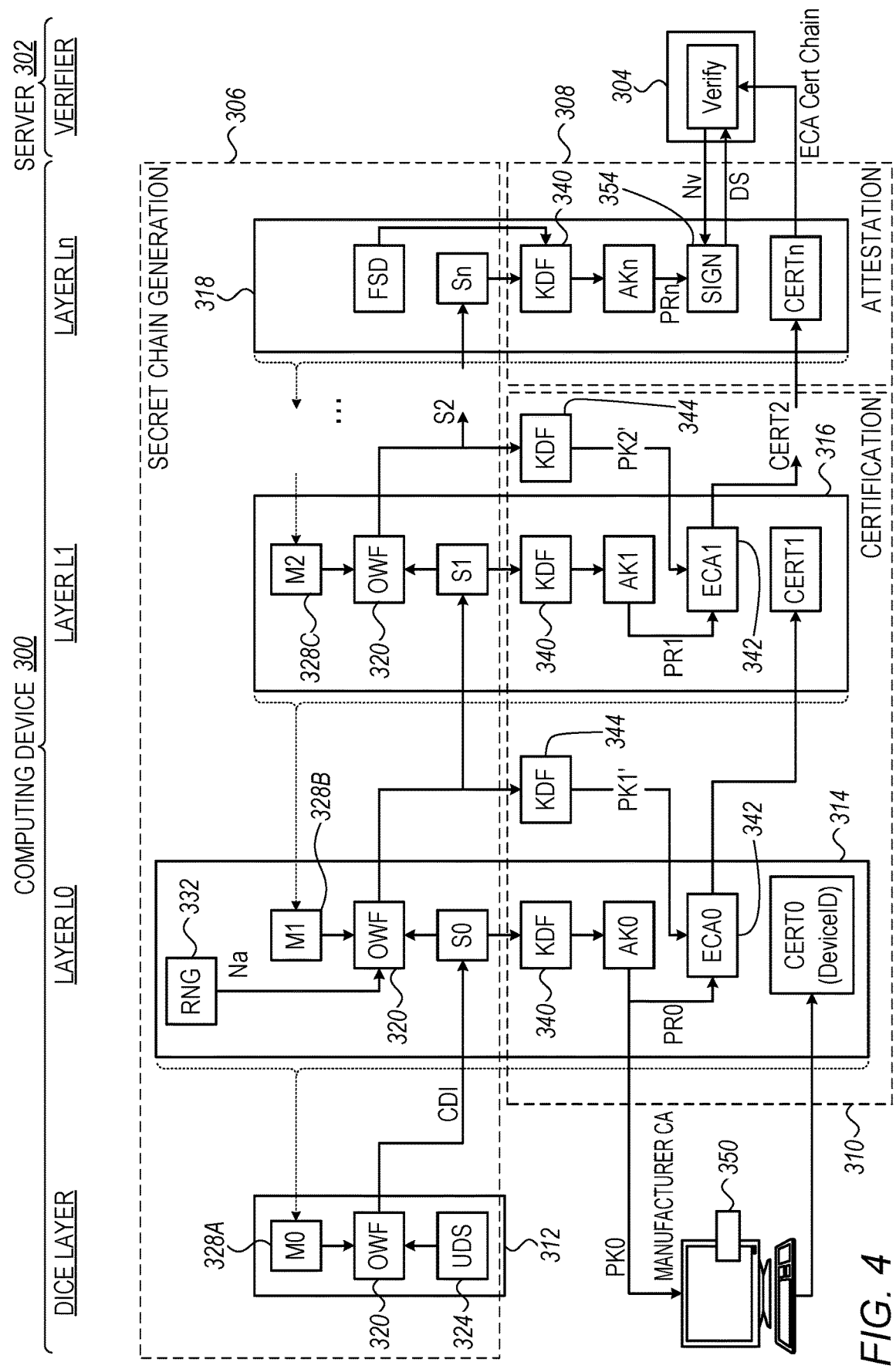
FIG. 4 is a diagram that schematically illustrates a device layering scheme used in asymmetric key attestation, in accordance with an embodiment that is described herein.

FIG. 4 is a diagram that schematically illustrates a device layering scheme used in asymmetric key attestation, in accordance with an embodiment that is described herein.

In FIG. 4 a computing device 300 is verified using a management server 302 running a verifier 304. Computing device 300, management server 302 and verifier 304 may be used in implementing computing device 24, management server 28 and verifier program 86 of FIG. 1.

Similarly to device 100 of FIG. 1, device 300 runs multiple layers of code, including a "DICE layer" 312 and layers of mutable code denoted L0 . . . Ln. In FIG. 4, only layers L0 314, layer L1 316 and layer Ln 318 are shown, for clarity. The DICE layer serves as a root of trust layer and is executed unconditionally upon device boot, in an embodiment. The layers L0 . . . Ln are executed in a predefined order, e.g., sequentially, after the DICE layer. The layer and secret key generation schemes in device 300 are generally similar to those described above for device 100.

Device 300 comprises a Secret Chain Generation (SCG) module 306, an attestation module 308 and a certification module 310. Similarly to SCG 106 of FIG. 2, SCG 306 generates a sequence of secrets denoted S0 . . . Sn using OWFs 320. The OWF of the DICE layer produces secret S0 that is used in layer L0, based on UDS 324 and a measurement M0 (328A) of layer L0. The OWF of L0 produces secret Si that is used in layer Li, and so on. The OWF of a given layer Li produces a secret Si+1 based on the secret Si produced by the previous layer Li-1, and a measurement Mi+1 of the next layer according to the layers order.

In the present example, attestation module 308 is coupled to the last layer Ln and therefore the device attests the DICE layer and the mutable layers L0 . . . Ln. Alternatively, attestation module 308 may be coupled to a mid-layer among L0 . . . Ln-1 and attest that layer and below.

In the present example, (similarly to device 100 described above) layer L0 comprises a Random Number Generator (RNG) 332 that generates a nonce "Na" after device boot. In some embodiments, the OWF of layer L0 receives as inputs (i) measurement M1 (328B) of layer L1, (ii) secret S0 from the DICE layer, and (iii) nonce Na generated using RNG 332. The OWF of layer L0 generates secret S1 for layer L1 by calculating, for example, S1=HMAC([M1|Na],S0), wherein S0 comprises the HMAC key and the concatenated data [M1|Na] is the data input to the HMAC function. In other layers a secret Si+1 is calculated as Si+1=HMAC([Mi+1],Si).

Certification module 310 produces a chain of certificates denoted CERT0 . . . CERTn associated with respective layers L0 . . . Ln. The certification process involves the usage of asymmetric keys denoted AK0 . . . AKn that are generated in corresponding layers L0 . . . Ln. In layer Li, processor 40 derives an asymmetric key denoted "AKi" by applying a suitable Key Derivation Function (KDF) 340 to the secret Si. KDF 340 may be the same as (or similar to) KDF 140 mentioned above. Each asymmetric key AKi comprises a public key denoted "PKi" and a corresponding private key denoted "PRi." In the present example, each of layers L0 . . . Ln−1 comprises an Embedded Certificate Authorization (ECA) 342. ECA0 of layer L0 produces certificate CERT1, ECA1 of layer L1 produces certificate CERT2, and so on.

In the example of FIG. 2, ECAi in layer Li, receives a private key PRi produced in the same layer Li, and a public key PKi+1' (generated in Li) that equals PKi+1 of the asymmetric key AKi+1 that is expected to be generated in the next layer Li+1. In some embodiments, ECAi produces a certificate CERTi+1 by signing public key PKi+1 using the private key PRi. Certificate CERTi+1 thus provides a proof that it was signed using the secret private key PRi of layer Li. Note that CERTi+1 implicitly certifies the measurement Mi measured by layer Li−1, via secret Si, the KDF of Li, AKi and ECAi.

In some embodiments, device 300 certifies the public key PK0 of layer L0 using an external Certification Authority (CA) 350 that provides a certificate denoted "CERT0" to layer L0 of the device. CERT0 certifies PK0, which is also referred to as a "DeviceID." When the manufacturer delegated CA 350 as the certification authority for the device, CERT0 proves that the device was manufactured by the relevant manufacturer. Alternatively or additionally, CERT0 may be provided to the device by the Original Equipment Manufacturer (OEM). In alternative embodiments, layer L0 may certify PK0 using any suitable self-certification method. In an embodiment, in layer Li of the device, the public key PKi−1 of AKi−1 may be used for validating the signature of certificate CERTi.

Attestation module 308 receives secret Sn of layer Ln, and produces from secret Sn, using KDF 340, an asymmetric key denoted AKn whose private key PRn is used for attestation. Attestation module 308 receives a challenge denoted "Nv" from verifier 304, and produces a digital signature response denoted "DS" by applying a signing function 354 to the challenge Nv using the private key PRn. Example signature generation and verification methods that are suitable for implementing function 354 for signing (and in the verifier for verification) are specified, for example, by the Federal Information Processing Standard Publication (FIPS PUB) 186-4, in "Digital Signature Standard (DSS)," July, 2013. Attestation module 308 further receives the chain of certificates CERT0 . . . CERTn that were accumulated along layers L0 . . . Ln. The part of the verifier in performing the attestation scheme will be described in detail bellow.

Figure 5A:
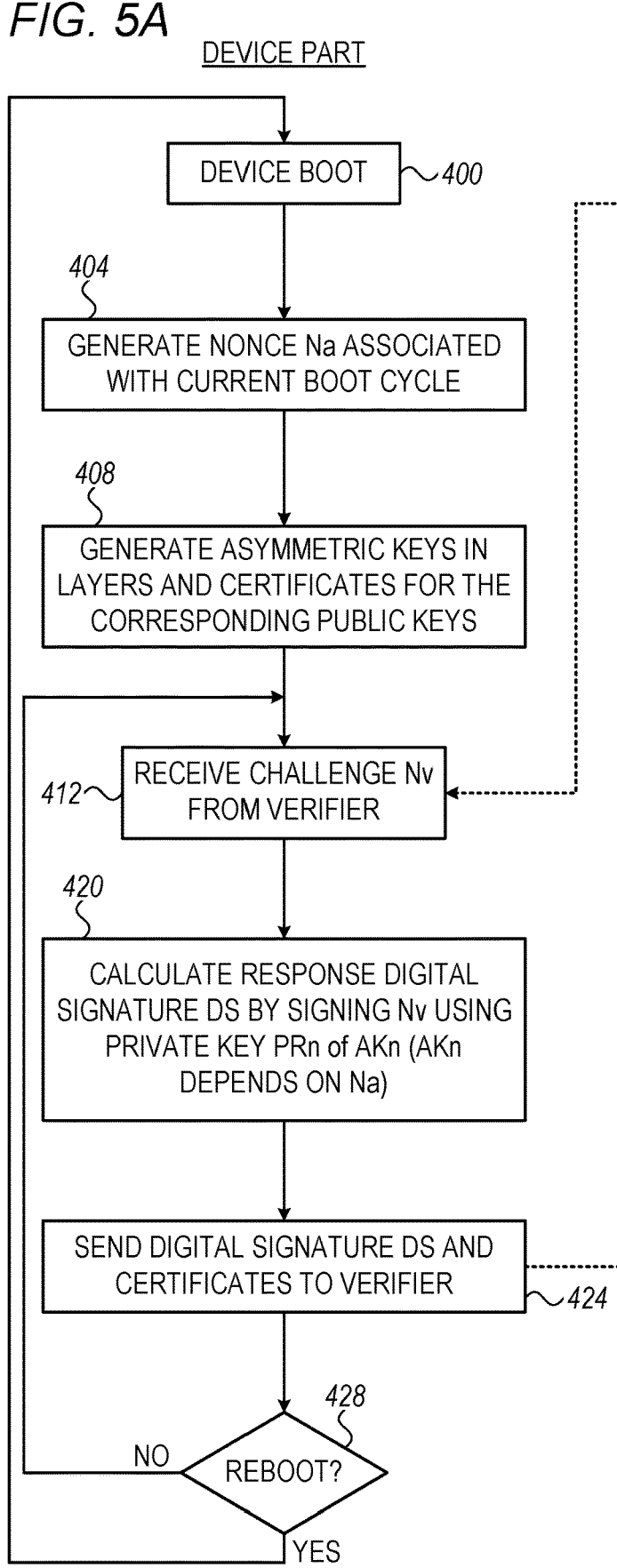
FIGS. 5A and 5B are flow charts that schematically illustrate methods for device attestation and verification using asymmetric key cryptography, in accordance with embodiments that are described herein.
Figure 5B:
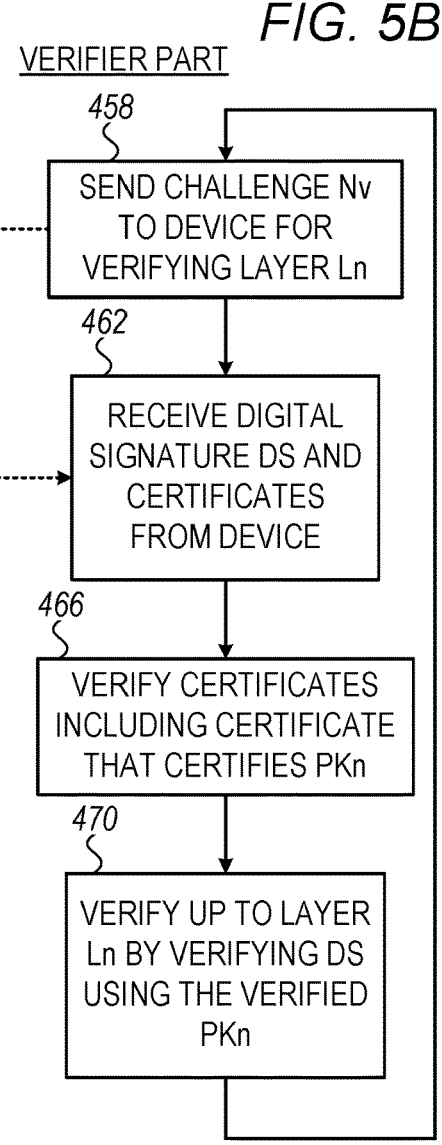

FIGS. 5A and 5B are flow charts that schematically illustrate methods for device attestation and verification using asymmetric key cryptography, in accordance with embodiments that are described herein.

The attestation scheme may be executed by device 24 and verifier 86 of FIG. 1. Device 24 is assumed implement the layering scheme depicted in FIG. 4. In performing the attestation protocol, the device and verifier may communicate with one another, e.g., over communication network 32.

The method of FIG. 5A (device part) begins with processor 40 of device 24 starting a boot cycle, at a booting step 400. In performing the boot, processor 40 starts executing the DICE layer 312. At a nonce generation step 404, the processor generates (e.g., using RNG 332) a nonce denoted "Na" that is uniquely associated with the present boot cycle. Alternatively, the processor may send (e.g., securely) the nonce Na across at least some of layers L1 . . . Ln, and send the Na to the verifier by a layer other than L0, e.g., Ln.

At a certificate generation step 408, the processor executes the layers L0 . . . Ln in accordance with a predefined order (e.g., sequentially), and generates at each layer Li, the asymmetric key AKi based on secret Si that was generated in layer Li−1. Further at layer Li, the processor produces (using ECAi) a certificate that certifies PKi+1 of AKi+1 of layer Li+1 and signed by the private key PRi of AKi.

At a challenge reception step 412, the processor receives form the verifier a challenge denoted "Nv". At a response calculation step 420, the processor calculates, in response to the challenge, a digital signature denoted "DS" by signing the challenge Nv using the private key PRn of the asymmetric key AKn (e.g., using signing function 354).

At a response transmission step 424, the processor sends the response DS and the certificates CERT0 . . . CERTn to the verifier, over communication network 32.

At a boot query step 428, the processor checks whether a reboot is required or occurring, and if not, loops back to step 412 to receive a subsequent challenge from the verifier. Otherwise, the processor loops back to step 400 to start a subsequent boot cycle and to generate a nonce Na having a different value compared to the Na value used in the previous boot cycle.

The method of FIG. 5B (verifier part) is typically performed in parallel to the method of FIG. 5A. The method of FIG. 5B begins with verifier 86 generating and sending a challenge denoted "Nv" to device 24, for verifying layers up to and including layer Ln, at a challenge sending step 458. The verifier may generate and send the challenge at any suitable time, such as, for example, in response to a service request from the device, an administrator request, or periodically.

At a response reception step 462 the host receives from the device a digital signature response (denoted DS) corresponding to the challenge Nv sent at step 458. The verification operation comprises mainly two phases, (i) verifying the certificates, and (ii) verifying the digital signature response, as described herein.

At a certificate verification step 466, the host verifies CERT0 . . . CERTn sent by the device at step 424. It is assumed that the verifier has in possession a Root Certificate of the Manufacturer CA 350, or the verifier can access the Root Certificate via the Authority Information Access (AIA) field in the CERT0 certificate. The verifier uses the Root Certificate to verify CERT0. The verifier further uses public key PK0 (DeviceID) from CERT0 to verify CERT1, and so on until verifying CERTn that certifies PKn. After concluding the certificates verification, PKn may be considered trusted.

At a digital signature verification step 470, the verifier verifies the DS response using PKn. The DS verification function at step 470 matches the signature generation function 354 used at the device side. This verification phase verifies the identity and state of the DICE layer and layers L0 . . . Ln.

Following step 270, the method loops back to step 458 for sending a subsequent different challenge Nv to the device, as required.

In some embodiments, after a device boot event, the verifier waits for the device to perform steps 400, 404 and

408 and indicate to the verifier that the device is ready for receiving a subsequent challenge.

The embodiments described above are given by way of example, and other suitable embodiments can also be used. For example, although in the embodiments above the chain of trust relies on the DICE layer serving as a root of trust, in alternative embodiments, other types of elements serving as a root of trust can also be used.

Although the embodiments described herein mainly address attestation schemes for devices connected to a wireless or land network, the methods and systems described herein can also be used in other applications, such as in cases in which the devices are connected to a verifier by a suitable bus, e.g., on a mother board or using cabling, e.g., in a car.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A device, comprising:
   a network interface configured to communicate with a verifier over a communication network;
   a memory configured to store multiple layers of mutable code, the multiple layers being identifiable by respective measurements; and
   a processor, configured to:
      for a given boot cycle, generate a nonce associated uniquely with the given boot cycle;
      receive a challenge from the verifier for attestation of a given layer of the mutable code;
      derive an attestation key depending on (i) a Unique Device Secret (UDS) stored securely in the device, (ii) a measurement of the given layer taken by another layer, and (iii) the nonce generated for the given boot cycle;
      calculate a response for the challenge, by signing the challenge using the attestation key that was derived depending at least on the nonce associated with the given boot cycle; and
      send the response to the verifier for verification of the given layer.

2. The device according to claim 1, wherein the attestation key comprises a symmetric key that depends on the nonce, and wherein the processor is configured to calculate the response by signing at least the challenge using the symmetric key, and to send both the response and the nonce to the verifier.

3. A method, comprising:
   in a device that communicates with a verifier over a communication network,
   storing in a memory of the device multiple layers of mutable code, the multiple layers being identifiable by respective measurements;
   for a given boot cycle, generating a nonce associated uniquely with the given boot cycle;
   receiving a challenge from the verifier for attestation of a given layer of the mutable code;
   deriving an attestation key depending on (i) a Unique Device Secret (UDS) stored securely in the device, (ii) a measurement of the given layer taken by another layer, and (iii) the nonce generated for the given boot cycle;
   calculating a response for the challenge, by signing the challenge using the attestation key that was derived depending at least on the nonce associated with the given boot cycle; and
   sending the response to the verifier for verification of the given layer.

4. The method according to claim 3, wherein the attestation key comprises a symmetric key that depends on the nonce, and wherein calculating the response comprises signing at least the challenge using the symmetric key, and sending both the response and the nonce to the verifier.

* * * * *